United States Patent [19]

Fawcett et al.

[11] Patent Number: 4,794,726
[45] Date of Patent: Jan. 3, 1989

[54] ALUMINUM FLAKE MULCH

[75] Inventors: Sherwood L. Fawcett; Martha S. Fawcett, both of Columbus; Donald L. Cullen, Worthington, all of Ohio

[73] Assignee: Transmet Corporation, Columbus, Ohio

[21] Appl. No.: 94,297

[22] Filed: Sep. 8, 1987

[51] Int. Cl.$^4$ .......................... A01G 13/00; A01C 1/04
[52] U.S. Cl. .............................. 47/9; 47/32; 47/25; 47/56
[58] Field of Search ............. 47/9, 32, 25, 28, 56; 111/1

[56] References Cited

U.S. PATENT DOCUMENTS

| | | | |
|---|---|---|---|
| 1,936,988 | 11/1933 | Otwell | 47/9 |
| 2,190,890 | 2/1937 | Sellei | 47/58 |
| 2,222,225 | 11/1940 | Green | 47/58 |
| 2,542,555 | 2/1951 | Moores | 47/9 |
| 2,571,491 | 10/1951 | Schindler | 47/9 |
| 2,669,804 | 2/1954 | Cohen | 47/9 |
| 2,740,233 | 4/1956 | Reynolds | 47/9 |
| 2,940,219 | 6/1960 | Schiller | 47/9 |
| 3,099,897 | 8/1963 | Letteron | 47/9 |
| 3,252,250 | 4/1964 | Lemaire | 47/9 |
| 3,252,251 | 5/1966 | Simmons | 47/9 |
| 3,382,610 | 4/1968 | Ferm | 47/9 |
| 3,775,147 | 11/1973 | Ferm | 106/271 |
| 3,857,195 | 12/1974 | Johnson | 47/9 |
| 3,891,423 | 6/1975 | Stanley et al. | 47/32 |
| 3,955,319 | 4/1976 | Smith | 47/9 |
| 4,215,084 | 7/1980 | Maringer | 264/8 |
| 4,286,408 | 9/1981 | Manno | 47/9 |
| 4,617,198 | 10/1986 | Overturf | 427/186 |

FOREIGN PATENT DOCUMENTS

| | | | |
|---|---|---|---|
| 216283 | 12/1960 | Austria | 47/9 |
| 125997 | 11/1984 | European Pat. Off. | 47/9 |
| 2457637 | 1/1981 | France | 47/9 |
| 5284 | 1/1978 | Japan | 47/9 |
| 44326 | 4/1978 | Japan | 47/29 |
| 40146 | 3/1979 | Japan | 47/9 |
| 28325 | 9/1979 | Japan | 47/9 |
| 1041530 | 2/1986 | Japan | 47/9 |
| 1369760 | 10/1974 | United Kingdom | 47/9 |

OTHER PUBLICATIONS

E. M. Emmert, "Plastic Mulch for Vegetables", from Kentucky Farm and Home Science, vol. 2, No. 1, Winter 1956.

Organic Gardening and Farming, p. 2, Organic World, "Steel Foil Planned as Mulch", May 1967.

Moreshet et al, "Aluminum Mulch Increases Quality and Yield of Orleans Apples", Hortscience, vol. 10(4), 8/75.

Primary Examiner—Robert A. Hafer
Assistant Examiner—Danton D. DeMille
Attorney, Agent, or Firm—Sidney W. Millard

[57] ABSTRACT

The invention comprises a mulch sheet to be placed on the soil around the stalk of a plant. The mulch comprises aluminum flakes bonded to a woven mesh which aluminum flakes will reflect rays of the sun upward to the underside of the leaves and the mat will hold moisture in the ground which has seeped into the ground through the porous mat. The aluminum flakes are applied to the upper tacky surface of a thermoplastic woven mat and are pressed into the tacky surface to hold them in position after the thermoplastic, fibrous mat cools to freeze the flake in place. In additional embodiments, it is sometimes appropriate to make a pod containing a seed which will be secured to the underside of the matting in the open hole. A layer on the underside of the mat could include a layer of fertilizer.

15 Claims, 2 Drawing Sheets

ALUMINUM FLAKE MULCH

FIELD OF THE INVENTION

This invention relates to a mulch to fit around the stems of growing plants to retard weed growth, enhance useful plant growth, minimize temperature variations at the roots and minimize pest infestation.

BACKGROUND OF THE INVENTION

Agriculture has used mulch since the beginning of time to enhance the growth of plants and minimize the growth of weeds. Mulch has taken the form of leaves, grass clippings, chips, and all kinds of biodegradable plant matter. The object is to cover the soil around the stem of the growing plant and over the roods to screen sunlight from the adjacent soil and minimize the growth of weeds. If there is no sunlight, the weeds will not grow. The mulch will also allow water from irrigation or rain to percolate through to the soil beneath the mulch. The overyling mulch layer will inherently slow the evaporation of water from the soil, and in theory will hold more water near the roots of the plant to increase its growth.

In this century, various modifications of the age old use of biodegradable vegetable matter as a mulch have been tried by various entities who tried to enhance the growth characteristics of plants with varying success. For example, U.S. Pat. Nos. 2,190,890 and 2,222,225 describe the use of flurescent dyes as a mulch. Plastic sheets of black, grey and white consistency are used to screen out sunlight, and their function is described in U.S. Pat. Nos. 3,252,250 and 3,955,319. A white powder mulch is described in U.S. Pat. No. 3,775,147. U.S. Pat. No. 3,099,897 describes using flake mica as mulch; aluminum foil is used and described in U.S. Pat. No. 2,740,233; and a mixture of aluminum flakes in an asphalt binder is described in U.S. Pat. No. 3,382,610.

All of these described products have some beneficial effect under certain circumstances. The trouble is that the circumstances are not universally applicable to all growing plants nor all climates where those plants may be grown. For the most part, the disclosures of all of the above-cited inventions overstate their benefits and do not state their limitations at all. What is needed is a reusable mulch which will enhance the growth of plants, minimize the evaporation of water, minimize the growth of weeds and state with specificity for what plants the specific mulch will be best suited.

SUMMARY OF THE INVENTION

This invention has solved the problem cited above, and the invention comprised aluminum flake bonded to a woven mesh which is structured to surround the stalk of a growing plant and reflect sunlight upward toward the underside of leaves on the plant.

Aluminum flake used in this invention is made by the rapid solidification of molten aluminum deposited on a spinning wheel which results in a more pure form of aluminum and a minimum of surface oxidation. Surface oxidation tends to absorb light and the reflected light is more diversely scattered.

Aluminum flakes prepared according to this invention are applied to the upper takcy surface of a thermoplastic woven mat and are pressed into the tacky surface to hold them in position after the thermoplastic, fibrous mat cools to freeze the flake in place.

The mat may be cut into different sizes in a subsequent manufacturing operation as needed, for example, eighteen inches by eighteen inches. A circular hole will be punched from the center of the square piece of mulch with the size of the punch being variable to accommodate the size of stalk anticipated for the plant which will grow. In order to place the square of aluminum flake mulch around a growing plant, it will be necessary to slit the mat from one edge toward the center hole. Whether the slit is from one edge or from a corner is totally immaterial to the functioning of the product.

After the mulch has been placed on the soil around the stalk of the plant, the aluminum flake on the upper surface of the mat will catch the rays of the sun and reflect them upward to the underside of the leaves of the plant. Additionally, the mat will hold moisture in the ground which has seeped into the ground through the porous mat, and thereby minimize the need for irrigation.

In additional embodiments of the invention, it is sometimes appropriate to make a pod containing a seed which will be secured to the underside of the matting in the open hole. Thereby, soil can be sprinkled on the top of the seed along with some water and with appropriate sunlight, the seed will germinate and grow in place in the hole.

A layer on the underside of the mat could include a layer of fertilizer which would be water-soluble, and then when rain occurs, the fertilizer will be carried to the roots of the plant. The fertilizer layer below the fibrous mat could be used with or without the aforementioned seed pod.

Another embodiment might include a seed in potting soil in a pot which could be attached to the underside of the matting in the area of the central hold, and thereby the germinating seed will grow in position as indicated.

One of the great benefits of the mat described is its reusability from one season to the next.

Another embodiment includes a non-woven fibrous mat impregnated with an appropriate adhesive to bond the fibers and flakes together after they are suitably pressed together to form a relatively thin flat sheet. The mulch could be in the form of squares as described above or a roll of the material of finite width and indefinite length.

Objects of the invention not clear from the above will be understood by a reading of the description of the preferred embodiment and a review of the drawings.

DESCRIPTION OF THE PREFERRED EMBODIMENTS

Figure 1:
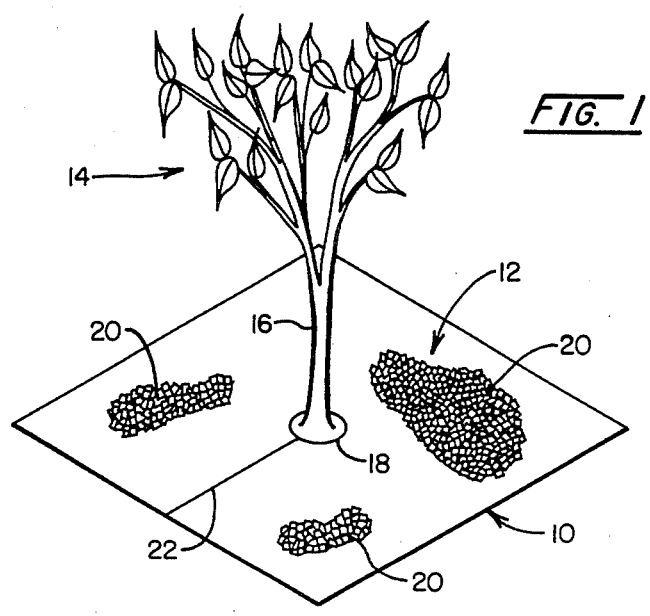
FIG. 1 is a perspective view of a mat according to the invention surrounding a growing plant.

Looking to FIG. 1, a mat or substrate 10 having a reflective upper surface 12 rests on a supporting base surrounding a plant 14. The stalk 16 of the plant projects through a circular opening 18 in the center of the mat. The mat may be assembled in place either before or after the plant has begun to grow.

The reflective upper surface 12 comprises a plurality of generally square, flat aluminum flakes 20. Flakes 20 have unique characteristics because of their purity. This occurs because of the unique way they are manufactured, and to the extent necessary for an understanding of this invention, the flakes are made with the apparatus and procedural steps described in U.S. Pat. No. 4,215,084 which is incorporated herein by reference.

The mat or substrate 10 comprises a woven fabric of thermoplastic fibers or fibers coated with thermoplastic material such that they will bond to each other. The thermoplastic mat is manufactured prior to the time the aluminum flake is adhered thereto, and the aluminum flake is applied to the upper tacky surface of the mat by a process and apparatus described in U.S. Pat. No. 4,617,198 and to the extent necessary for an understanding of this invention, such patent disclosure is incorporated herein by reference.

It is contemplated that a foraminous mat may incorporate the flakes 20 by an adhesive, and such a modification is within the inventive concept.

In operation, the mat will be stored from year to year in a suitable place, and when it is ready for installation around a plant, the adjacent edges of the mat will be separated along a slit 22 which extends from an edge 24 of the mat to the central opening 18. When the stalk 16 of the plant 14 slips into the opening 18, the slit 22 will be closed again to provide a relatively uniform mulch around the stalk of the plant. The fibers forming the mat are loosely woven for the express purpose of allowing water to seep through the loose fibers and penetrate the ground around the roots of the plant. In that sense, the invention is not significantly different from any other mulch. What is different is the aluminum flake 20 adhered to the upper surface of the mat. In the bright sunshine, the aluminum flakes will reflect sunlight upward from the surface of the flakes and thereby keep the soil beneath at a cooler temperature, thereby minimizing the evaporation of water around the roots of the plant. That does not mean that the aluminum flakes will not get hot. Indeed, they will get hot, and the resulting benefit is that crawling pests will not crawl over the reflective, hot surface to crawl up the stalk of the plant and eat the leaves and/or fruit. It may be that the texture of the mat and flake combination is the reason crawling insects shy away but the fact is, fewer crawling insects are present on plants protected by this invention than adjacent plants without the protection.

With the mat 10 installed, reflected sunlight will impinge on the underside of the leaves of the plant. It is well known that plants turn with the sun as it passes from east to west during the day and spreads its leaves to a maximum to get as much energy from the sun as possible, thereby to generate the energy for growth and production of fruit. What sunlight is not received by the top surface of the leaves is lost. However, with the upwardly facing aluminum flakes, the sunlight which impinges on the mulching mat will be partially reflected upward to the underside of the leaves. Thereby, each leaf will receive an enhanced supply of energy from the sun.

The fact that the reflected light impinges on the underside of the leaves is of a twofold benefit. The first is obvious, in that it increases the amount of sunlight available for use by the leaves. The second benefit, which is not quite so obvious, is that parasites and leaf-eating pests more often than not accumulate on the underside of the leaf. The reason for pests being on the underside of the leaf is that it is cooler, the leaf will shield them from the sun, and it allows them to hide from predators, such as birds. With this invention and the reflective surface making the underside of the leaf exposed to sunlight, albeit reflected and not of the same magnitude, aphids and pests of a similar nature will tend to migrate away from the underside of the leaf, and hence the plant growth will be less retarded by pests, healthier from the outset, and will produce more and bigger fruit.

An experiment was conducted using a mat having a reflective upper surface as described above, and temperature measurements were conducted during the day in direct sunlight, and the temperature beneath the mat was from three to four degrees Farenheit cooler than the temperature of soil five inches away. Similarly, tests done in the middle of the night in the same areas showed that the temperature under the mat was three to four degrees Farenheit warmer than the adjacent soil. The conclusion is that the mat of this invention keeps the soil around the roots of a plant at a more uniform temperature. This is believed to be beneficial to some plants but does not appear to benefit other plants; examples are set out below.

EXPERIMENT NO. 1

Beans were planted in late May or early June, and in some plants, the light reflecting mat was used, and in the control plants nothing was used. The plants were harvested in July, and the results are summarized as follows:

| Subject Matter | Aluminum Flake | Control | Ratio of Flake to Control |
|---|---|---|---|
| Average number of bean pods per plant | 14 | 10.7 | 1.31 |
| Average weight of beans per plant, grams | 82 | 55 | 1.49 |
| Weight per plant of plants as pulled, incl. roots, grams | 95 | 68 | 1.40 |
| Weight per plant of plants dried, grams | 13 | 9 | 1.44 |

EXPERIMENT NO. 2

Twelve late cabbage plants which had been seeded on June 6 were set out on June 24. Six were surrounded by a one square foot collar of aluminum flake glued to a plastic screen. The other six were planted similarly, but with no aluminum flake collars. Throughout the growing life, the same amount of water, fertilizer, insect spray and weeding was done to both sets of plants. The garden was located in the hill country of southern Ohio. Early in the season, one of each of the sets of plants was lost, so the experiment was completed with five plants in each set.

Throughout the growing season, it was visually obvious that the plants with aluminum flake collars were doing better than the plants without the aluminum flake collars.

All plants were pulled on November 24, washed and weighed. The heads were prepared for "market" and weighed. The results were as follows:

Ratio of weight of plants with aluminum flake collars/weight of plants without aluminum flake collars: 2.18

Ratio of weight of heads on plants with aluminum flake collars/weight of heads on plants without aluminum flake collars: 2.17

EXPERIMENT NO. 3

Two tomato plants were grown from seed under identical condition in an indoor environment with "grow lights." Both plants were exposed to the same light, water, etc. conditions. The only difference was that one plant had a light reflective collar according to this invention and the other did not. The experiment was terminated before any tomatoes were ripe, but at that time, the plant with the collar had one and one-half as many tomatoes as the plant without the collar.

Experiments are ongoing at this time with grapes, and all indications are that the reflective collar of this invention is beneficial. No hard data is presently available.

Figure 2:
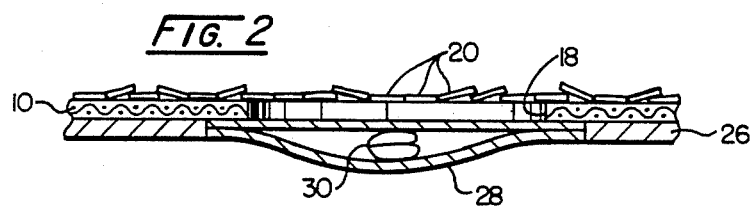
FIG. 2 is a sectional view of a mat according to the invention having a layer of fertilizer on the underside and a seed packet in the hole in the middle of the matting.

In describing another embodiment of the invention as illustrated in FIG. 2, a layer of fertilizer 26 may be incorporated as a part of the structure whereby the layer of aluminum flakes is adhered to the upper surface of the substrate 10, and a layer of water-soluble fertilizer 26 is juxtaposed to the lower surface of the substrate 10.

A seed pod 28 holding a seed 30 may be mounted in the opening or aperture 18, and when it is desirable to plant to product, the mat may be placed on the surface of the soil, a small amount of soil sprinkled on the upper surface of the seed pod 28 and water applied to cause the seed 30 to germinate.

Figure 3:
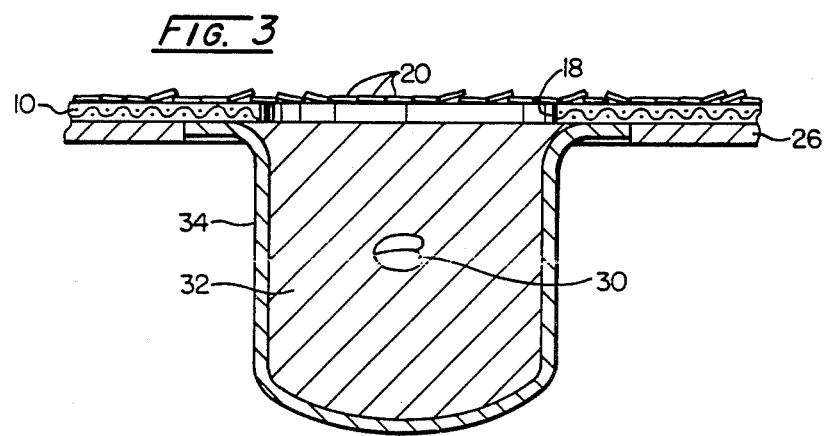
FIG. 3 is a sectional view of a mat similar to FIG. 2 but having a pot filled with potting soil adhered to the underside of the matting at the center hole.

An alternative embodiment is illustrated in FIG. 3, where the seed 30 is incorporated in potting soil 32 held in a pot 34, and with the pot adhered to the lower surface of the substrate 10 in a position such that the open, upper surface of the pot is aligned with the opening 18 in the substrate.

Discussion above concerns plants in general, but the experimental data is limited to cabbages, tomatoes, grapes, and beans. Experiments were conducted with other agricultural crops. The experimental data for crops which did not show increased yields has not been included merely to save space. Where increased yields were not evident, the collar invention may still have been beneficial by preventing crawling insects from approaching the plant during daylight hours.

Various sizes of apertures 18 were considered, but the only real concern is to have the aperture of a size such that it will not inhibit the vertical or horizontal growth of the plant. It is better that the aperture be too large than to be too small. After the plant reaches an early stage of growth, most of the aperture area will be shaded by the leaves so the loss of reflected light due to a larger aperture will be minimal.

Figure 4:
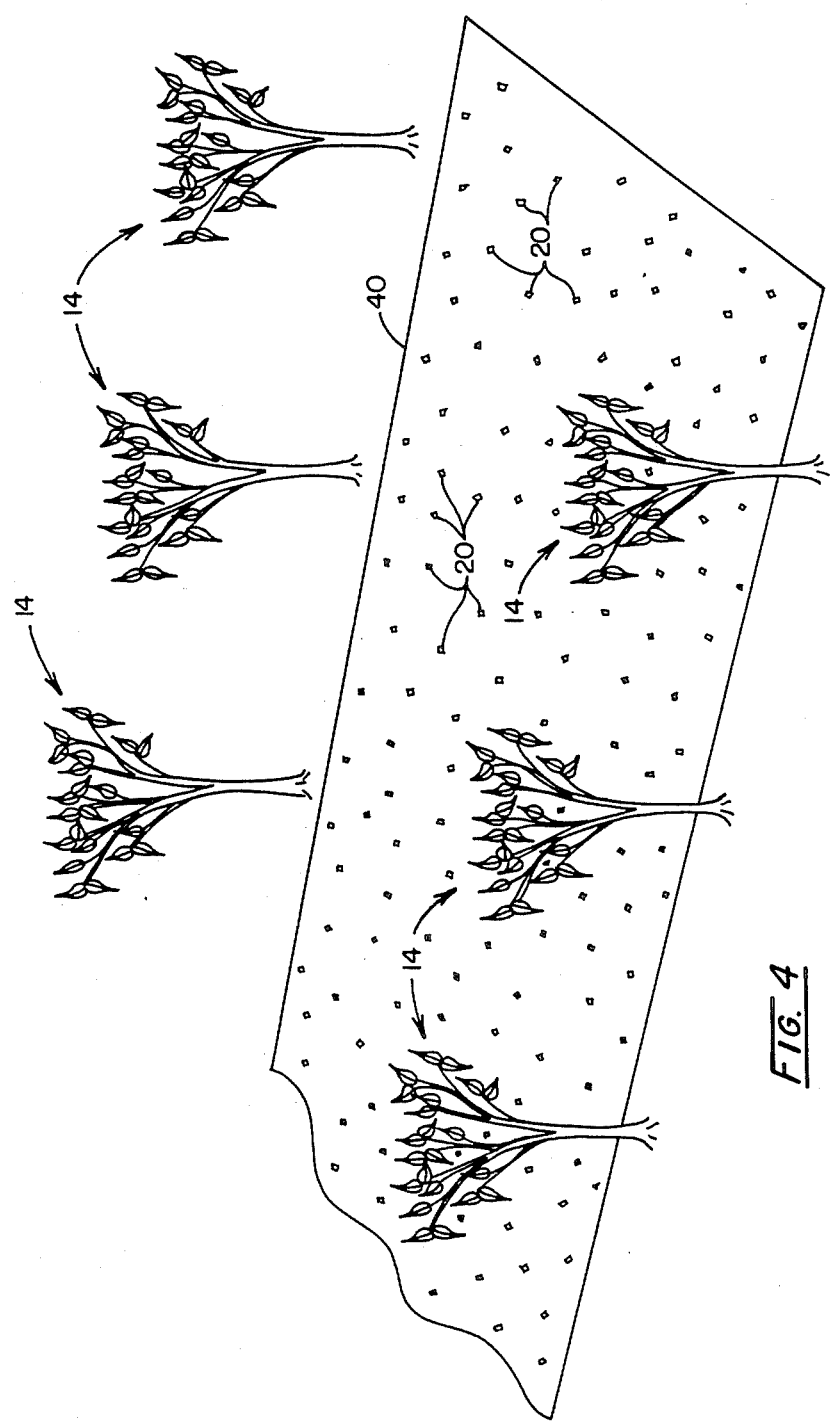
FIG. 4 is a perspective view of a non-woven fibrous mat prepared according to this invention disposed between two rows of growing plants.

Looking now to FIG. 4, it is contemplated that a mat 40 of woven or unwoven fibers may be provided in the form of a roll. The mat may be spread on the ground between rows of plants 14 to serve the same purpose as conventional black plastic, namely, sunlight is blocked from the soil so weeds cannot grow. With this invention the additional benefits of porosity, light reflection and insect repellant are achieved. The light reflection will be due to a sprinkling of aluminum flakes 20 adhered to the mat. It is intended that the mat be thermoplastic or if not thermoplastic that the mat be impregnated with an appropriate adhesive so that the fibers will adhere to each and to the flake 20. Examples of suitable fibers are fiberglass and polyester either alone or in combination.

It is intended that the fibers and flakes be pressed together to form a relatively thin sheet which may be stored in the form of a roll and cut to size as needed. Obviously, the roll could have spaced holes and plants could be transparent in the soil through the holes if desired.

Having described the invention in its preferred embodiments, it will be clear that modifications may be made without departing from the spirit of the invention. It is not intended that the words used to describe the invention nor the drawings illustrating the same be limiting on the invention. Rather, it is intended that the invention only be limited by the scope of the appended claims.

I claim:

1. A sheet mulch comprising,
   fibers bonded together and pressed together to form a thin sheet of finite width and indefinite length, said sheet having an upper surface and a lower surface,
   a plurality of aluminum flakes adhered to the fibers of the sheet and oriented to reflect sunlight upward from the upper surface of the sheet, the combination of fibers and flakes providing a rough upper surface to said sheet which will inhibit the passage of crawling plant pests,
   said sheet of fibers and flakes having the property of allowing water to penetrate between the fibers from its upper to its lower surface by gravity and allowing only a minimum of sunlight to penetrate from its upper to its lower surface.

2. The sheet of claim 1 including fertilizer incorporated as a part of said sheet.

3. The sheet of claim 2 wherein the fertilizer is in the form of a layer affixed to the lower surface of said sheet.

4. A light reflecting collar for installing around the stalk of a growing plant to increase its growth and minimize attacks from crawling insects comprising:
   a thin, flat foraminous substrate having a peripheral edge and upper and lower surfaces, said substrate being formed of fibers bonded together but spaced apart sufficiently to allow the passage of water by gravity, means forming an aperture through said substrate from said upper to said lower surface, the size of said aperture being such that the stalk of a growing plant projection through said aperture will not be inhibited in its vertical or transverse growth, a slit extending from the peripheral edge to the aperture to allow this slit to be opened and the collar to be pulled from around a growing plant by the stalk passing from the aperture through the slit to the periphery,
   a plurality of flat aluminum flakes bonded to the upper surface of said substrate, said flakes having an upper surface and a lower surface, the lower surface of said flakes being bonded to said substrate, the upper surface of said flakes being light reflective whereby light impinging on the upper surface of said flakes will be reflected upward toward the under surface of any leaves on said plant, and
   the combination of bonded fibers and flakes providing a surface for said collar which in rough to the touch and will inhibit the passage of crawling insects.

5. The collar of claim 4 wherein fertilizer is incorporated as a layer beneath said substrate.

6. The collar of claim 6 including means for holding a seed in said aperture to allow said seed to germinate and form said stalk.

7. The collar of claim 5 including a pot filled with soil and including a seed in said soil,
said pot being open at its top, means for mounting the pot to the substrate with the open top of the pot aligned with said aperture.

8. The collar of claim 4 including means for holding a seed in said aperture to allow said seed to germinate and form said stalk.

9. The collar of claim 4 including a pot filled with soil and including a seed in said soil,
said pot being open at its top, means for mounting the pot to the substrate with the open top of the pot aligned with said aperture.

10. The collar of claim 4 wherein the plant is cabbage.

11. The collar of claim 4 wherein the plant is bean.

12. The collar of claim 4 wherein the plant is tomato.

13. The collar of claim 4 wherein the plant is grape.

14. A process for minimizing temperature variation around the roots of a plant, increasing light impinging on the leaves of said plant and minimizing crawling insects on the plant, comprising:
providing a woven mat and adhering aluminum flakes to said mat, said flakes being so located on the mat as to reflect light, the combination of flakes and woven mat providing a surface rough to the touch which will inhibit the passage of crawling insects,
forming an aperture in the central area of said mat, said aperture being of a size to accommodate the stalk of a plant,
severing said mat from its edge to the aperture to form a channel for the passage of the stalk of a plant,
spreading the severed area of the mat and pulling said mat around a plant whereby the stalk of the plant passes through the channel into the aperture, and
closing the aperture with the stalk in the aperture with the aluminum flakes facing upward toward the leaves of the plant.

15. The process of claim 14 wherein the plant is selected from the group consisting of cabbage, bean, grape and tomato.

* * * * *